Figure 1:
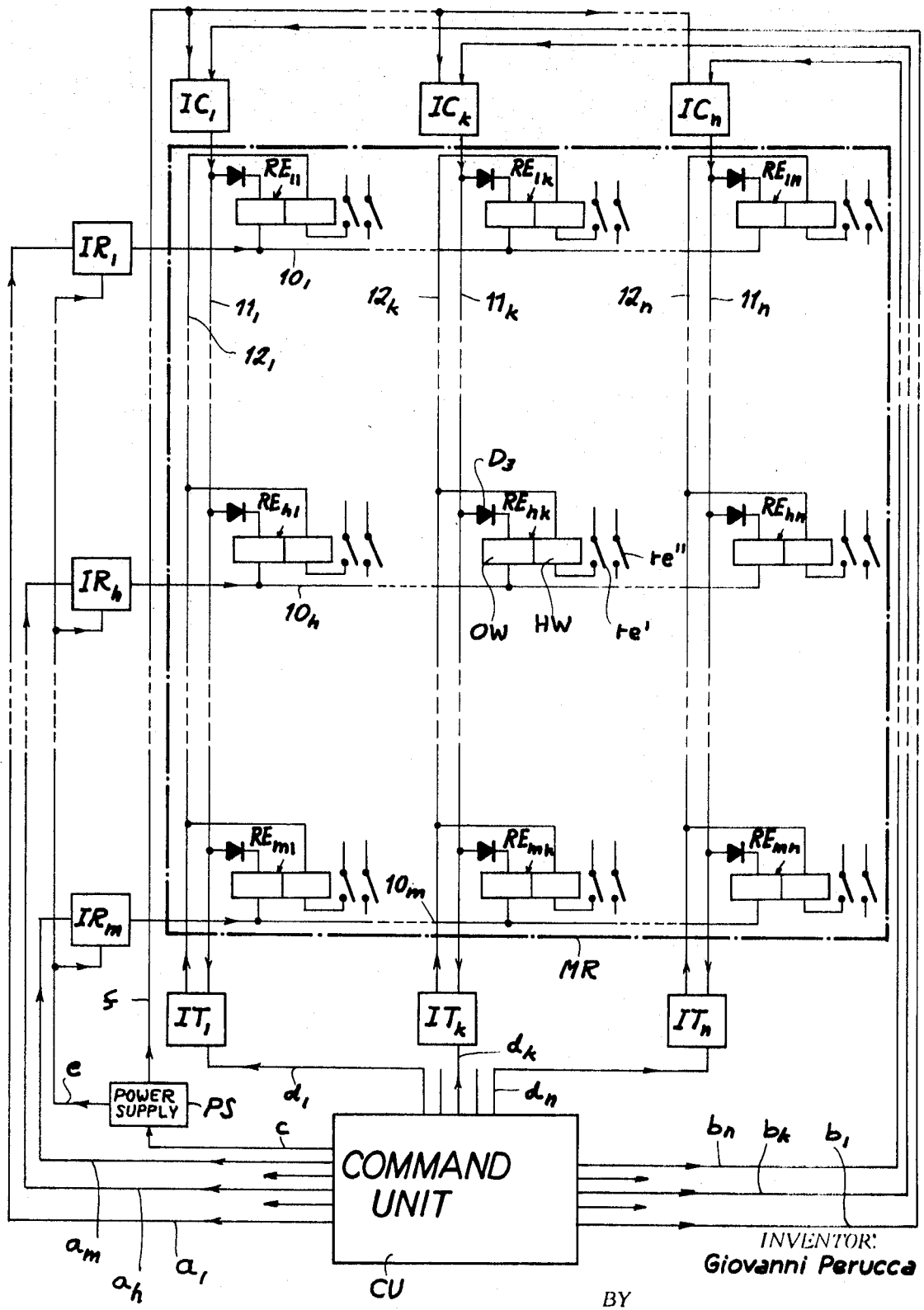

United States Patent

[11] 3,621,147

[72] Inventor Giovanni Perucca
 Turin, Italy
[21] Appl. No. 848,977
[22] Filed Aug. 11, 1969
[45] Patented Nov. 16, 1971
[73] Assignee CSELT Centro Studi e Lboratori
 Telecomunicazioni S.p.A.
 Turin, Italy
[32] Priority Aug. 13, 1968
[33] Italy
[31] 52824-A/68

[54] ELECTRONICALLY CONTROLLED CROSSBAR SWITCH
 12 Claims, 2 Drawing Figs.
[52] U.S. Cl. .................................................. 179/18 GE
[51] Int. Cl. .................................................. H04q 3/42
[50] Field of Search .......................................... 179/18 GE

[56] References Cited
UNITED STATES PATENTS
3,308,244 3/1967 Bruglemans.................. 179/18 GE
FOREIGN PATENTS
1,146,531 4/1963 Germany...................... 179/18 GE Primary Examiner—Kathleen H. Claffy
Assistant Examiner—William A. Helvestine
Attorney—Karl F. Ross ABSTRACT: A crossbar switch for a telecommunication system has relays with operating windings and holding windings positioned at the junctions of "horizontal" and "vertical" conductors individual to respective rows and columns, the operating windings of all relays of one row being connected at one end to a common row-control circuit and at their other ends to individual column-control circuits by way of these conductors. The two control circuits include controlled rectifiers which during certain periods receive operating voltage from a central power supply for the selective energization of a relay in response to concurrent firing pulses applied to the respective controlled rectifiers. A maintenance circuit, also including a normally deenergized controlled rectifier, energizes the holding winding of the selected relay in response to the firing of the controlled rectifier of the corresponding column-control circuit and subsequently releases that relay upon deactivation of its own controlled rectifier by a disconnect pulse.

ELECTRONICALLY CONTROLLED CROSSBAR SWITCH

My present invention relates to a crossbar switch for telephone and other telecommunication systems wherein incoming and outgoing lines are selectively interconnected at the junctions of two sets of orthogonally intersecting conductors with the aid of relay contacts placed at these junctions. For convenience, the conductors of one set are usually referred to as horizontal, extending along respective rows of junctions, whereas the conductors of the other set are referred to as vertical, forming columns of junctions wi the first-mentioned conductors. In conventional coordinate or crossbar switches of this type, the junction relays are under the control of selector magnets and hold magnets, the former being assigned to respective rows whereas the latter serve respective columns. Upon the concurrent operation of a selector magnet and a hold magnet, a relay at the junction uniquely defined by the corresponding row and column is energized to complete the connection between the two lines intersecting at that junction.

The general object of my present invention is to provide electronic circuitry with semiconductive switching elements replacing the conventional selector and hold magnets of such crossbar switches to accelerate the seizure and release of a selected junction.

Another object is to provide means in such a system for minimizing the consumption of electrical energy by the crossbar switch and associated circuitry, with virtually no power loss occurring at any nay unselected junction and in the control circuits assigned thereto.

It is also an object of this invention to provide a system of the type referred to wherein the energy required for the switching of the junction relays is derived from an independent power supply not needed for the maintenance of energization of any selected relay whereby that power supply can be deactivated for considerable periods of time since its intervention will be required only during the establishment of a new connection.

In accordance with an important feature of my present invention, row-control circuits, column-control circuits and maintenance circuits for the several junction relays are provided with first, second and third controlled rectifiers, respectively, the concurrent firing of a combination of first and second controlled rectifiers in a chosen row-control and column-control circuit during an operating period of a normally inoperative common power supply resulting in the energization of an operating winding of a selected junction relay. Upon the substantially simultaneous firing of a third controlled rectifier in a corresponding maintenance circuit, common to the same junctions as the associated column-control circuit, a holding winding of the selected relay is energized in series with a concurrently attracted armature of that relay and remains in that state until a disconnect pulse applied to an input of the maintenance circuit deenergizes the previously fired third controlled rectifier.

According to a more specific feature of my invention, the firing of the third controlled rectifier is accomplished via a connection extending from the associated column-control circuit so as to occur upon the energization of the second controlled rectifier in the latter circuit. In the energized state of any junction relay, a lockout gate in the corresponding column-control circuit blocks the transmission of a firing pulse to the second controlled rectifier thereof in order to prevent the concurrent operation of more than one junction relay in a column. The blocking signal, coinciding with the energization of the holding winding, occurs slightly after the appearance of the original firing pulse.

Figure 2:
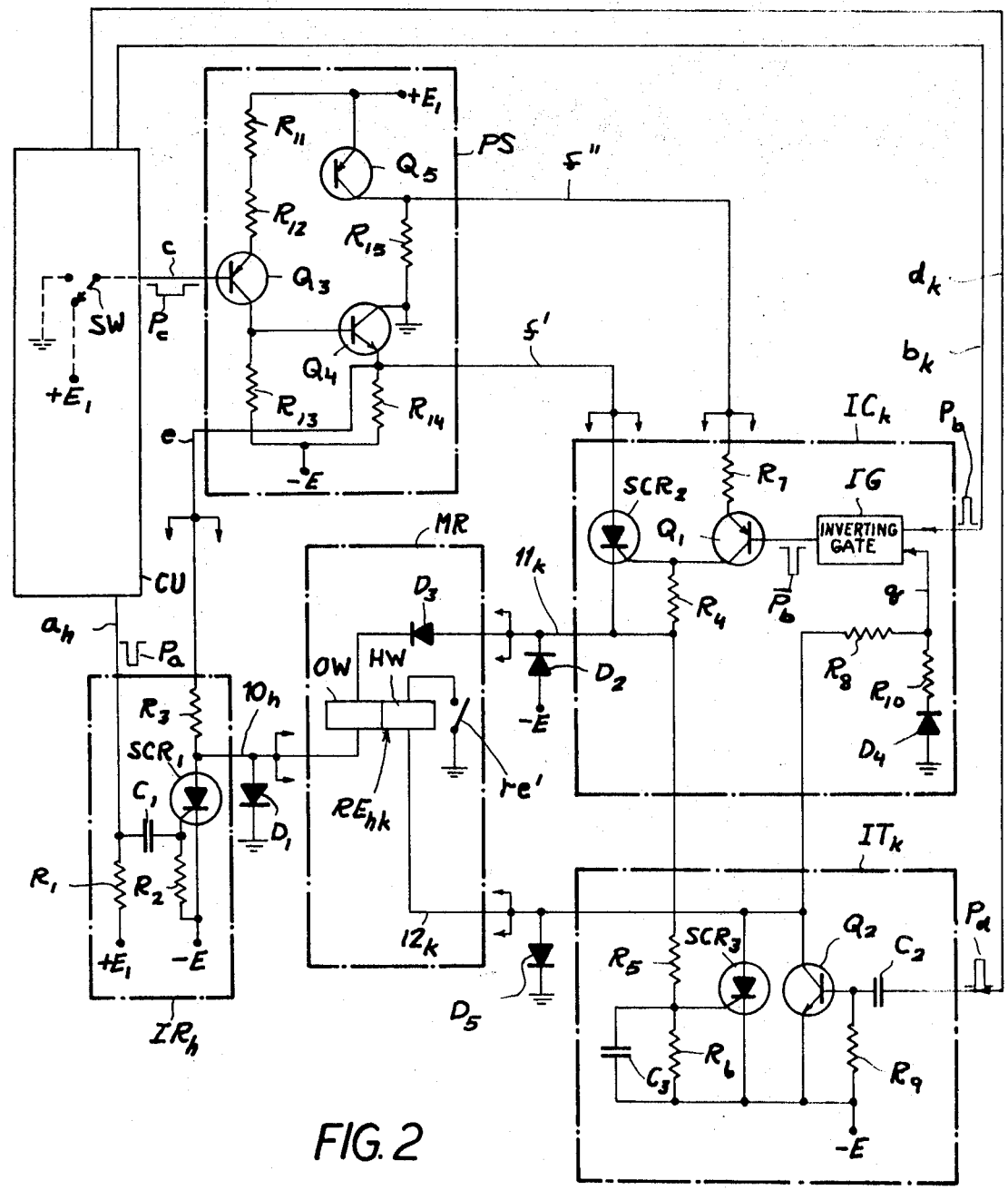

The above and other features of my invention will be described in greater detail hereinafter with reference to the accompanying drawing in which:

FIG. 1 is a block diagram showing a crossbar switch embodying my present improvement; and FIG. 2 is a circuit diagram showing details of representation units included in the network of FIG. 1.

In FIG. 1 I have shown the basic structure of my improved crossbar switch comprising a matrix MR of horizontal conductors $10_1$–$10_m$ and vertical conductors $11_1$–$11_n$, only the first and last as well as an intermediate conductor $10_h$, $11_k$ of each array being shown. It will be understood that, as in conventional crossbar switches these conductors are accompanied by respective line wires extending along intersecting rows and columns so as to form a multiplicity of junctions therebetween. Each of these junctions is served by a respective switching relay designated by the letters RE with a subscript denoting the intersecting row and column, such as $RE_{11}$ for the relay at the junction of conductors $10_1$ and $11_1$, relay $RE_{hk}$ at the junction of conductors $10_h$ and $11_k$, and $RE_{mn}$ at the junction of conductors $10_m$ and $11_n$. As particularly indicated for relay $RE_{hk}$, which is representative of all other switching relays and will be described in greater detail hereinafter with reference to FIG. 2, each of these relays is provided with an operating winding OW and with a holding winding HW connected in aiding relationship therewith, the relay having a holding armature $re'$ and a working armature $re''$. The working armature, not further referred to hereinafter, serves to establish a connection between the associated horizontal and vertical line wires not shown.

Operating winding OW of relay $RE_{hk}$ is connected, in parallel with corresponding windings of the remaining relays $RE_{h1}$–$RE_{hn}$ of that row, to conductor $10_h$ and, in parallel with corresponding windings of all other relays $RE_{1k}$–$RE_{mk}$ of the same column, to conductor $11_k$ by way of an individual diode $D_3$. This winding, therefore, can be energized by the concurrent application of different voltages to the row conductor $10_h$ and the column conductor $11_k$. Holding winding HW of relay $RE_{hk}$ is connected between the front contact of armature $re'$ and a locking conductor $12_k$ extending along column conductor $11_k$, similar locking conductors $12_1$ and $12_n$ have been illustrated for the first and the last column of the matrix MR served by conductors $11_1$ and $11_n$.

All the row conductors $10_1$... $10_h$... $10_m$ originate at respective row-control circuits $IC_1$... $IR_k$... $IR_m$; similar column-control circuits $IC_1$... $IC_k$... $IC_n$ are provided for the column conductors $11_1$... $11_k$... $11_n$. These column-control circuits are paired with respective maintenance circuits $IT_1$... $IT_k$... $IT_n$ from which the locking conductors $12_1$... $12_h$... $12_n$ extend.

A command unit CU serves for the selective energization of any row and column conductor to operate one of a switching relays at a corresponding junction. For this purpose, unit CU has a first set of output lead $a_1$... $a_h$... $a_m$ for activating the circuits $IR_1$... $IR_h$... $IR_m$, a second set of output leads $b_1$... $b_k$... $b_n$ for activating the circuits $IC_1$... $IC_k$... $IC_n$, a further lead $c$ terminating at a common power supply PS, and an additional set of activating leads $d_1$... $d_k$... $d_n$ for the circuits $IT_1$... $IT_k$... $IT_n$. Bus bars $e$ and $f$ extend from power supply PS to all the row-control circuits $IR_1$ etc. and all the column-control circuits $IC_1$ etc. respectively.

I shall now describe, in connection with FIG. 2 and with particular reference to relay $RE_{hk}$ and the associated control and maintenance circuits $IR_h$, $IC_k$ and $IT_k$, the operation of the crossbar switch of FIG. 1 in the establishment and the release of a connection between two intersecting telephone lines.

Row-control unit $IR_h$ comprises a first solid-state e.g. silicon) controlled rectifier $SCR_1$ whose cathode is connected to a source of negative voltage $-E$, its gate electrode being connected to the same source by way of a resistor $R_2$ and to positive voltage $+E_1$ via a condenser $C_1$ in series with a resistor $R_1$. Command lead $a_h$ from unit CU is tied to the junction of resistor $R_1$ and condenser $C_1$. The anode of controlled rectifier $SCR_1$ is connected to bus bar $e$ through a resistor $R_3$ and is directly connected to the row conductor $10_h$ leading to the operating winding OW of relay $RE_{hk}$ in matrix MR. The circuit of that operating winding is extended via diode $D_3$ and column conductor $11_k$ to the junction of two series resistors $R_4$, $R_5$ connected, in series with a further resistor $R_6$, between the gate electrode of a second controlled rectifier $SCR_2$ in unit $IC_k$ and negative potential $-E$. A third controlled rectiifer $SCR_3$ within unit $IT_k$ has its gate electrode connected to the junction of resistors $R_5$ and $R_6$, the latter resistor being shunted by a capacitor $C_3$. The cathode of controlled rectifier $SCR_3$ is connected directly to potential $-E$ whereas the anode thereof is tied to conductor $12_k$ leading to holding winding HW of relay $RE_{hk}$. Thus, winding HW is energizable upon the firing of the normally nonconductive controlled rectifier $SCR_3$ in a circuit including the grounded armature $re'$ after the latter has been attracted by energization of winding OW.

Conductor $11_k$ is also connected directly to the cathode of controlled rectifier $SCR_2$ whose anode is linked by a wire $f$ to the power supply PS; wire $f$ and a companion wire $f'$ are jointly represented in FIG. 1 by the bus bar $f$. The gate electrode of controlled rectifier $SCR_2$ is also connected to the collector of a PNP-transistor $Q_1$ whose emitter is tied to wire $f'$ through a resistor $R_7$. Lead $b_k$, emanating from command unit CU, is connected through an inverting gate IG to the base of transistor $Q_1$, this gate being conductive in the presence of a relatively positive potential (ground) applied to an input $q$ thereof via a diode $D_4$ and a resistor $R_{10}$. Input $q$ is also connected through a resistor $R_8$ to the collector of an NPN-transistor $Q_2$ whose emitter directly receives the negative voltage $-E$ and is returned to its base through a resistor $R_9$, the base being further coupled to lead $d_k$ by way of a condenser $C_2$.

Normally reverse-biased diodes $D_1$ (grounded), $D_2$ (connected to negative voltage $-E$) and $D_3$ (grounded) serve to protect the controlled rectifiers $SCR_1$, $SCR_2$, $SCR_3$, respectively, against transient overvoltages due to the inductivity of windings OW and HW upon deenergization of these windings.

Power supply PS comprises a two-stage transistor circuit including a first stage in the form of a PNP-transistor $Q_3$ and a second stage constituted by an NPN-transistor $Q_4$ and a PNP-transistor $Q_5$. The base of transistor $Q_3$ is tied to lead $c$ which, within unit CU, is shown normally connected to positive voltage $+E$ through a switch SW which can be reversed to ground the base for a predetermined interval. The emitter of transistor $Q_3$ is connected to potential $+E_1$ through a voltage divider consisting of two resistors $R_{11}$, $R_{12}$ whose junction is tied to the base of transistor $Q_5$; the collector of transistor $Q_3$ is connected directly to the base of transistor $Q_4$ and through a resistor $R_{13}$ to negative potential $-E$. The emitter of transistor $Q_4$ is connected directly to wires $e$ and $f$ and through resistor $R_{14}$ to negative-voltage source $-E$, its collector being grounded. The collector of transistor $Q_5$ is connected directly to wire $f'$ and to ground through a resistor $R_{15}$, its emitter being connected to positive voltage $+E$.

In the quiescent state of the system shown in FIG. 2, switch SW is in its illustrated position and all the circuits are deenergized; with negative potential $-E$ on all three electrodes of controlled rectifier $SCR_1$, no current flows through that rectifier or through any of the associated resistors in unit $IR_h$. Transistor $Q_3$ is biased to cutoff, transistors $Q_4$ and $Q_5$ being also nonconducting; controlled rectifier $SCR_2$ is also connected between equipotential points $-E$ whereas controlled rectifier $SCR_3$ and transistor $Q_2$ are open-circuited except for the negligible current flow by way of diodes $D_4$ and $D_5$. Thus, the current consumption at this state is virtually nil.

When a junction of matrix MR is to be closed, switch SW in unit CU is briefly reversed to generate a negative pulse $P_c$ on lead $c$ whereby transistor $Q_3$ is rendered conductive; pulse $P_c$ may be periodically generated by a timer in command unit CU or may come into existence, in response to a selection signal, concurrently with a relatively short negative firing pulse $P_a$ on lead $a_h$ and a simultaneous positive firing pulse $P_b$ on lead $b_k$. In any event, these firing pulses will occur only during an operating interval of power supply PS established by the enabling pulse $P_c$.

With the first transistor stage $Q_3$ conducting, the transistors $Q_4$ and $Q_5$ of the second stage are also carried to saturation whereby wire $f$ is grounded and positive voltage $+E_1$ appears on wire $f'$. The trailing edge of firing pulse $P_a$ breaks down the controlled rectifier $SCR_1$ which thereupon remains conductive for the duration of enabling pulse $P_c$. At the same time, the inverted firing pulse $\overline{P}_b$ from gate FIG. causes the switching transistor $Q_1$ to saturate and to fire the associated controlled rectifier $SCR_2$ whose conductivity also lasts for the remainder of the enabling interval. Relay winding OW, lying between the anode of the first controlled rectifier $SCR_1$ and the cathode of the second controlled rectifier $SCR_2$, is thus energized to attract its armature whereby ground potential is applied to the anode of the third controlled rectifier $SCR_3$ via armature $re'$ and winding HW. After a short delay determined by the time constant of RC network $C_3$, $R_6$, controlled rectifier $SCR_3$ also breaks down to maintain the relay $RE_{hk}$ operated notwithstanding the subsequent deenergization of winding OW upon termination of enabling pulse $P_c$. Negative bias on gate input $q$, due to the breakdown of controlled rectifier $SCR_3$, blocks the gate FIG. against transmission of further firing pulses $P_b$ to transistor $Q_1$, serving as a starting amplifier for controlled rectifier $SCR_2$, for as long as the relay is thus operated.

When the connection so established is to be released, a disconnect pulse $P_d$ of positive polarity appears on lead $d_k$ and, via coupling condenser $C_2$, briefly renders transistor $Q_2$ conductive. Controlled rectifier $SCR_3$, starved of current, is thereby cut off so that winding HW is deenergized and armature $re'$ reopens the holding circuit of relay $RE_{hk}$. The system is then returned to its nondissipative initial state.

It will be observed that, even with relay $RE_{hk}$ operated, only a local circuit from source $-E$ is closed while no power is consumed in units $IR_h$ and $IC_k$ after the selection phase has terminated.

In the system described above, negative-voltage source $-E$ is designed to supply operating current to the various controlled rectifiers and relay windings whereas positive-voltage source $+E_1$ is merely required to furnish biasing potentials to transistors $Q_3$, $Q_5$ and to capacitor $C_1$; the latter voltage, therefore, may be derived from a source of relatively low power. Naturally, not all the potentials $+E_1$ and $-E$ need to have the same magnitude or to be obtained from the same source, so long as the desired cutoff conditions are maintained in the quiescent state.

Although switch SW has been illustrated diagrammatically as a mechanical contact, it will be understood that pulse $P_c$ as well as pulses $P_a$, $P_b$ and $P_d$ may be obtained electronically from logical circuitry with positive potential ($+E_1$) denoting the state "1" and ground denoting the state "0."

I claim:

1. A cross bar switch forming a matrix of intersecting rows and columns with individual row conductors and column conductors, respectively; a multiplicity of relays at the junctions of respective columns and rows, each of said relays having an operating winding connected between the corresponding row and column conductors and a holding winding in series with an armature of the relay; a multiplicity of row-control circuits each including a normally nonconductive first controlled rectifier connected between a respective row conductor and a source of first operating potential for the operating windings of the associated relays; a multiplicity of column-control circuits each including a normally nonconductive second controlled rectifier connected between a respective column conductor and a source of second operating potential for the operating windings of the associated relays; a multiplicity of maintenance circuits each including a normally nonconductive third controlled rectifier connected between an ancillary conductor common to the holding windings of all the relays of a respective column and a source of operating potential for the energization of the holding winding of a selected relay by way of said armature; a normally inoperative common power supply for all said controlled rectifiers; switch means for temporarily activating said power supply; and selector means for transmitting a firing pulse to a combination of first and second controlled rectifiers in a chosen row-control and column circuit during an operating period of said power supply to energize the operating winding of a selected relay and for substantially simultaneously firing a third controlled rectifier in a corresponding maintenance circuit to energize the holding winding of said selected relay; said maintenance circuits being provided with normally nonconductive transistors shunting said third controlled rectifiers, said transistors having inputs connected to receive disconnect pulses for rendering same conductive to cut off a previously fired third controlled rectifier, thereby releasing the corresponding relay.

2. A crossbar switch as defined in claim 1, wherein corresponding column-control circuits and maintenance circuits are provided with interconnecting leads for firing said third controlled rectifiers in response to the energization of a corresponding second controlled rectiifer.

3. A crossbar switch as defined in claim 1 wherein all said controlled rectifiers are provided with reverse-biased shunt diodes for protecting same against transients.

4. A crossbar switch as defined in claim 1 wherein said power supply comprises a first transistor stage and a second transistor stage controlled by said first stage, said second stage having output leads extending to said row-control and column-control circuits.

5. A crossbar switch as defined in claim 4 wherein said column-control circuits include respective starting amplifiers for said second controlled rectifiers, said second stage comprising a pair of output transistors for delivering a first operating voltage to said first and second controlled rectifiers and a second operating voltage to said starting transistors.

6. A crossbar switch as defined in claim 1 wherein said selector means forms part of a command unit common to all said row-control and column-control circuits, said power supply being controlled from said command unit.

7. A crossbar switch forming a matrix of intersecting rows and columns with individual row conductors and column conductors, respectively; a multiplicity of relays at the junctions of respective columns and rows, each of said relays having an operating winding connected between the corresponding row and column conductors and a holding winding in series with an armature of the relay; a multiplicity of row-control circuits each including a normally nonconductive first controlled rectifier connected between a respective row conductor and a source of first operating potential for the operating windings of the associated relays; a multiplicity of column-control circuits each including a normally nonconductive second controlled rectifier connected between a respective column conductor and a source of second operating potential for the operating windings of the associated relays; a multiplicity of maintenance circuits each including a normally nonconductive third controlled rectifier connected between an ancillary conductor common to the holding windings of all the relays of a respective column and a source of operating potential for the energization of the holding winding of a selected relay by way of said armature; a normally inoperative common power supply for all said controlled rectifiers; switch means for temporarily activating said power supply; and selector means for transmitting a firing pulse to a combination of first and second controlled rectifiers in a chosen row-control and column-control circuit during an operating period of said power supply to energize the operating winding of a selected relay and for subsequently firing a third controlled rectifier in a corresponding maintenance circuit to energize the holding winding of said selected relay, said column-control circuits being provided with gate means responsive to energization of the third controlled rectifier in a corresponding maintenance circuit for blocking the application of a firing pulse to said second controlled rectifiers; said maintenance circuits being provided with inputs for receiving disconnect pulses deenergizing a previously fired third controlled rectifier to release the corresponding relay.

8. A crossbar switch as defined in claim 7 wherein corresponding column-control circuits and maintenance circuits are provided with interconnecting leads for firing said third controlled rectifiers in response to the energization of a corresponding second controlled rectifier, said leads being provided with delay networks for retarding the energization of said third controlled rectifiers.

9. A crossbar switch as defined in claim 7 wherein said maintenance circuits are provided with normally nonconductive transistors shunting said third controlled rectifiers, said inputs terminating at said transistors for rendering same conductive to cut off the associated controlled rectifiers.

10. A crossbar switch forming a matrix of intersecting rows and columns with individual row conductors and column conductors, respectively; a multiplicity of relays at the junctions of respective columns and rows, each of said relays having an operating winding connected between the corresponding row and column conductors and a holding winding in series with an armature of the relay; a multiplicity of row-control circuits each including a normally nonconductive first controlled rectifier connected between a respective row conductor and a source of first operating potential for the operating windings of the associated relays; a multiplicity of column-control circuits each including a normally nonconductive second controlled rectifier connected between a respective column conductor, a starting amplifier for said second controlled rectifier and a source of second operating potential for the operating windings of the associated relays; a multiplicity of maintenance circuits each including a normally nonconductive third controlled rectifier connected between an ancillary conductor common to the holding windings of all the relays of a respective column and a source of operating potential for the energization of the holding winding of a selected relay by way of said armature; a normally inoperative common power supply for all said controlled rectifiers; switch means for temporarily activating said power supply; and selector means for transmitting a firing pulse to a combination of first and second controlled rectifiers in a chosen row-control and column-control circuit during an operating period of said power supply to energize the operating winding of a selected relay and for substantially simultaneously firing a third controlled rectifier in a corresponding maintenance circuit to energize the holding winding of said selected relay, said maintenance circuits being provided with inputs for receiving disconnect pulses deenergizing a previously fired third controlled rectifier to release the corresponding relay; said power supply comprising a first transistor stage and a second transistor stage controlled by said first stage, said second stage including a pair of output transistors for delivering a first operating voltage to said first and second controlled rectifiers and a second operating voltage to said starting transistors.

11. A crossbar switch as defined in claim 10 wherein said column-control circuits are provided with gate means responsive to energization of the third controlled rectifier in a corresponding maintenance circuit for blocking the application of a firing pulse to said second controlled rectifiers.

12. A crossbar switch as defined in claim 10 where in said output transistors are of opposite conductivity types and said operating voltages are of opposite polarities.

* * * * *